United States Patent
Lin et al.

(10) Patent No.: US 6,980,827 B2
(45) Date of Patent: Dec. 27, 2005

(54) AUDIO ACCESSORY SWITCHING CIRCUIT

(75) Inventors: Tan Thok Lin, Penang (MY); Soo Kee Eng, Perak (MY); Macwein Krishnamurthi, Selangor (MY); Nasrudin B Abd. Muthalib, Penang (MY)

(73) Assignee: Motorola, Inc., Schaumburg, IL (US)

( * ) Notice: Subject to any disclaimer, the term of this patent is extended or adjusted under 35 U.S.C. 154(b) by 812 days.

(21) Appl. No.: 09/852,837

(22) Filed: May 10, 2001

(65) Prior Publication Data

US 2002/0168999 A1 Nov. 14, 2002

(51) Int. Cl.$^7$ ................................................ H04B 1/38
(52) U.S. Cl. ................ 455/556.1; 455/344; 455/550.1; 455/569.1
(58) Field of Search ........................... 455/569.1, 569.2, 455/403, 556.1, 462, 550.1, 557.1, 567, 575.2, 455/575.1, 90.3, 344, 345, 350, 66.1, 557; 327/430; 379/420; 381/74

(56) References Cited

U.S. PATENT DOCUMENTS

| | | | |
|---|---|---|---|
| 4,103,186 A | * | 7/1978 | Albarran et al. ............. 327/430 |
| 4,591,661 A | * | 5/1986 | Benedetto et al. ........... 455/462 |
| 4,993,061 A | * | 2/1991 | Hsieh .......................... 455/403 |
| 6,038,457 A | * | 3/2000 | Barkat ...................... 455/556.1 |
| 6,167,251 A | | 12/2000 | Segal et al. |
| 6,349,223 B1 | * | 2/2002 | Chen ........................ 455/569.2 |
| 6,594,366 B1 | * | 7/2003 | Adams ...................... 455/575.2 |
| 6,788,953 B1 | * | 9/2004 | Cheah et al. ............. 455/550.1 |

* cited by examiner

*Primary Examiner*—Lana Le
(74) *Attorney, Agent, or Firm*—Hisashi D. Watanabe

(57) ABSTRACT

This invention includes a switching circuit that allows a cellular phone with an audio accessory to arbitrate between cellular telephone calls and other audio inputs. In one embodiment, a cellular telephone having a MP3 accessory uses the invention to automatically switch a single set of speakers from the stereo MP3 signal to the mono phone signal whenever a call is transmitted or received. An advantage of the invention is that the user need not switch between music and phone call when the phone rings, as the invention takes care of this automatically.

4 Claims, 1 Drawing Sheet

AUDIO ACCESSORY SWITCHING CIRCUIT

TECHNICAL FIELD

This invention relates generally to electronic input arbitration circuits, and more specifically to circuits that arbitrate two or more audio inputs to a single pair of speakers.

BACKGROUND

Cellular telephones are becoming more and more popular. According to the Cellular Telecommunications Industry Association, there were over 97 million cellular telephones in use in the United States alone in 1999. As more and more people become "cell phone active", they begin to demand more and more features from their telephones.

Numerous products on the market today incorporate non-traditional features into cellular phones. For example, the StarTac™ series phone manufactured by Motorola can be purchased with a clip-on personal data assistant, which is capable of storing appointments, phone lists, and to-do reminders. Additionally, the Visor™ personal data assistant manufactured by Handspring has an expansion slot that allows it to become a cellular telephone.

One such accessory for cellular telephones that has been recently incorporated is a MP3 player. "MP3" is an acronym that stands for MPEG-1 Audio Layer-3, which is a standard technology format for compressing digital music into a small file format. MP-3 technology allows large amounts of information to be stored in small, relatively inexpensive memory chips. Many cellular phone manufacturers, including Motorola, will soon offer clip-on devices that allow people to play MP-3 music through their cellular phone.

There is a challenge in this design, however, in that cellular phone users want to use the same speaker or headphones for MP-3 music as they do for cellular calls. In other words, people want their headset to automatically switch from phone call to MP-3 music, without having to adjust the headset. This creates a problem in that MP-3 music is in stereo, which means that the music channel for the left ear and the music channel for the right ear are separate. Cellular calls, on the other hand are mono, meaning that the same channel is fed to both ears. Thus, any automatic switching circuit must provide for this difference. Additionally, there is great pressure to keep the cost of electronic products low. Thus, any solution must have a small part count.

A need therefore exists for a system capable of switching between telephone calls and other audio accessories in cellular telephones.

DETAILED DESCRIPTION OF THE INVENTION

Figure 1:
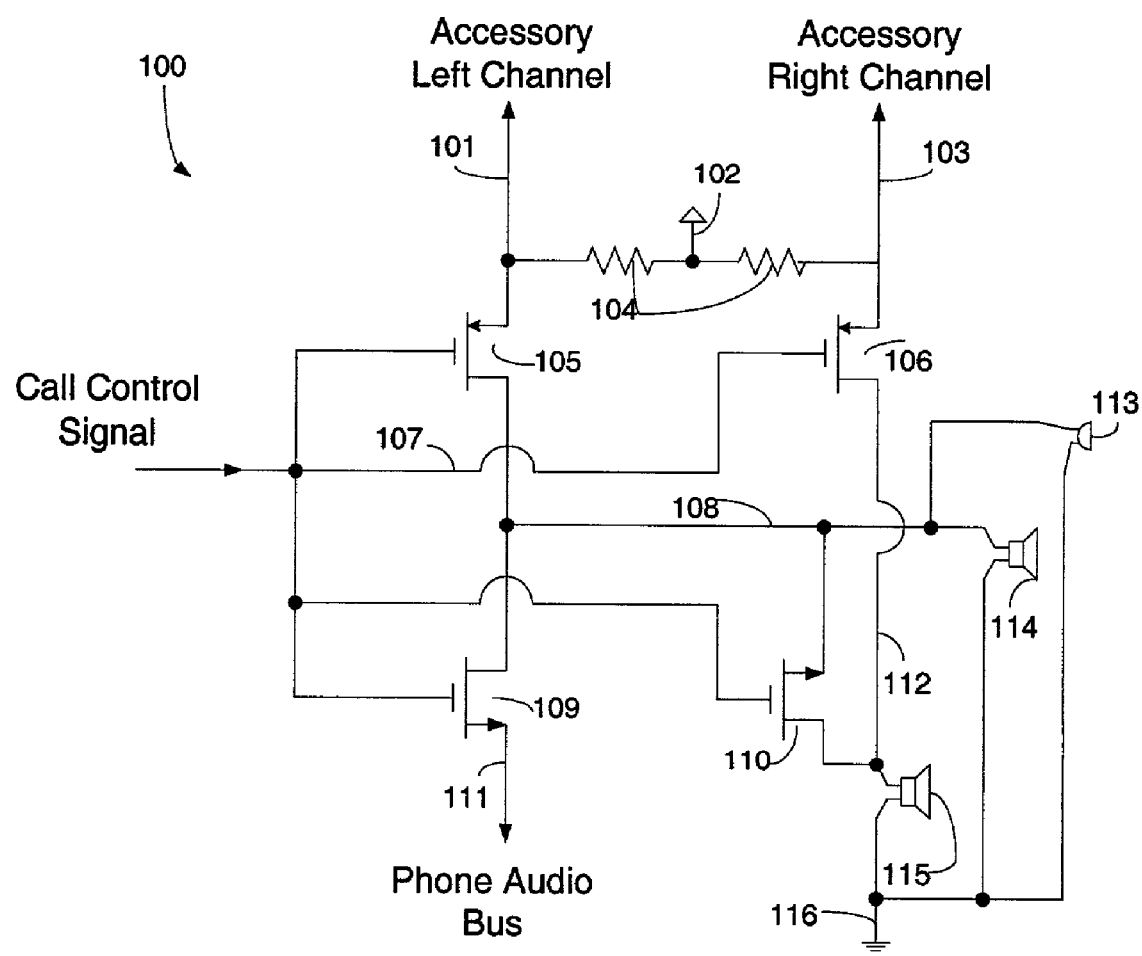
FIG. 1 illustrates a preferred embodiment of a switching circuit in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a preferred embodiment of a switching circuit 100 in accordance with the invention. This preferred embodiment has four inputs: a mono phone audio line 111, an accessory left channel 101, an accessory right channel 103 and a call control signal 107. The phone audio line 111 carries analog signals from the phone circuitry (not shown) to the speakers 114,115, as well as from the microphone 113 to the phone circuitry. The accessory right and left channels 101,103 provide audio input from an external device, like an MP3 player for example. The call control signal 107 is an interrupt line that becomes active when a call is being received or transmitted, but otherwise remains idle.

When no call is being transmitted or received, the call control signal 107 is low. The call control signal is coupled to four transistors: a left accessory transistor 105, a right accessory transistor 106, a left phone transistor 109 and a right transistor 110. In a preferred embodiment, the transistors 105,106,109,110 are metal-oxide semiconductor field-effect transistors (MOSFETs). The left and right accessory transistors 105,106 are p-channel MOSFETs, while the left and right phone transistors 109,110 are n-channel MOSFETs.

When the call control signal is low, the left and right accessory transistors 105, 106 are biased in the conducting or "ON" state, while the left and right phone transistors 109,110 are "OFF". This allows the left accessory channel 101 to pass through the left accessory transistor 105 to the left common node 108 and on to the left speaker 114. Likewise, the right accessory channel 103 passes through the right accessory transistor to the right common node 112 and into the right speaker 115.

When a call is transmitted or received, the accessory channels 101,103 must be turned off, and the phone audio bus 111 must be coupled to both speakers 114,115. This is accomplished via the call control signal 107. As stated earlier, when a call is transmitted or received, the call control signal 107 goes to an active high voltage. The active high voltage causes the left and right accessory transistors 105, 106 to turn off, while the left and right phone transistors 109,110 turn on. This causes the left accessory channel 101 to be disconnected from the left common node 108, and the right accessory channel 103 to be disconnected from the right common node 112. The phone audio bus 111 may now pass through the left phone transistor 109, the common node 108 and the right phone transistor 110 to the left common node 108 and right common node 112 respectively. In this manner, the phone audio bus 111 is coupled to both the left speaker 114 and the right speaker.

Note that the microphone 113 is also coupled to the phone audio bus 111 when a call is being transmitted or received. As the phone audio bus 111 is a mono, bidirectional line, input and output are coupled to the same bus 111. A ground node 116 provides a common reference for the differential signals that are applied to the speakers 114,115 and generated by the microphone 113. Additionally, the pull-up resistors 104 coupled to the power node 102 ensure proper biasing of the left and right accessory transistors 105,106.

In this preferred embodiment, the call control signal 107 is active high, which means that when no call is being received or transmitted, the call control signal 107 is low, or 0 volts. When a call is present, the call control signal switches to a level of 2.5–5 volts. The invention works equally well for active low, provided that the transistor conventions are switched, i.e. N-channel devices are switched with P-channel devices and vice versa. Additionally, the invention is not limited to using MOSFETs as the transistors. Bipolar transistors, relays, JFETs, vacuum tubes and the like may be equally substituted.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, this exemplary circuit 100 is for a single audio accessory, but the invention is not so limited. It could easily be expanded to multiple accessories by adding additional control signals and p-channel transistors.

What is claimed is:

1. A switching circuit comprising:
   a. at least one accessory transistor;
   b. at least one phone transistor;
   c. at least one call control signal coupled to the at least one accessory transistor and the at least one phone transistor;
   d. at least one accessory channel coupled to the at least one accessory transistor;
   e. at least one phone audio bus coupled to the at least one phone transistor; and
   f. at least one speaker;
   wherein when the call control signal is active the at least one phone channel is coupled to the speaker, and when the call control signal is not active the at least one accessory channel is coupled to the at least one speaker.

2. The circuit of claim 1, further comprising at least one microphone coupled to the at least one phone transistor.

3. The circuit of claim 2, wherein the at least one accessory channel comprises a right audio channel and a left audio channel.

4. The circuit of claim 3, wherein the at least one speaker comprises a right speaker and a left speaker.

* * * * *